United States Patent [19]

Mills

[11] Patent Number: 5,761,363

[45] Date of Patent: Jun. 2, 1998

[54] OPTICAL FIBER RIBBON WHICH IS STRIPPABLE AND PEELABLE

[75] Inventor: Gregory A. Mills, Claremont, N.C.

[73] Assignee: Siecor Corporation, Hickory, N.C.

[21] Appl. No.: 612,139

[22] Filed: Mar. 7, 1996

[51] Int. Cl.⁶ ............................................. G02B 6/44
[52] U.S. Cl. ................................................. 385/114
[58] Field of Search ............................... 385/100–114

[56] References Cited

U.S. PATENT DOCUMENTS

| | | | |
|---|---|---|---|
| 4,072,400 | 2/1978 | Claypoole et al. | 350/96.3 |
| 4,089,585 | 5/1978 | Slaughter et al. | 350/96.23 |
| 4,176,910 | 12/1979 | Noethe | 350/96.23 |
| 4,213,672 | 7/1980 | Aulich et al. | 350/96.23 |
| 4,289,375 | 9/1981 | Anderson et al. | 350/96.23 |
| 4,468,091 | 8/1984 | Schmadel et al. | 350/96.3 |
| 4,904,051 | 2/1990 | Broer et al. | 350/96.3 |
| 4,953,945 | 9/1990 | Nishimura et al. | 350/96.23 |
| 5,101,461 | 3/1992 | Nakajima | 385/42 |
| 5,182,786 | 1/1993 | Kinaga et al. | 385/128 |
| 5,377,293 | 12/1994 | Hatori et al. | 385/128 |
| 5,408,564 | 4/1995 | Mills | 385/128 |
| 5,441,813 | 8/1995 | Sano et al. | 428/375 |
| 5,524,164 | 6/1996 | Hattori et al. | 385/114 |
| 5,538,791 | 7/1996 | Shustack | 428/392 |
| 5,561,730 | 10/1996 | Lochkovic et al. | 385/114 |
| 5,562,985 | 10/1996 | Sano et al. | 428/375 |

FOREIGN PATENT DOCUMENTS

| | | |
|---|---|---|
| 58-115402 | 7/1983 | Japan |
| 01-152405 | 6/1989 | Japan |

OTHER PUBLICATIONS

Dialog, JAPIO, Publication No. 01–319006, Published Dec. 25, 1989, Inventors: Fuchigami Kenya, et al.

Dialog, JAPIO, Publication No. 02–118608, Published May 2, 1990, Inventor: Hosoya Toshifumi.

Dialog, JAPIO, Publication No. 01–152405, Published Jun. 14, 1989, Inventors: Okagawa Shuji, et al.

Dialog, JAPIO, Publication No. 02–022611, Published Jan. 25, 1990; Inventors: Nonaka Takeshi, et al.

Dialog, Derwent WPI, JP 63200109, Published Aug. 18, 1988, Assignee: Sumitomo Elec. Ind. KK.

Dialog, JAPIO, Publication No. 01–319714, Published Dec. 26, 1989, Inventors: Nonaka Takeshi, et al.

"Testing of 4–and 8–Fiber Ribbon Strippability", Gregory A. Mills, International Wire & Cable Symposium Proceedings 1992, pp. 472–475.

*Primary Examiner*—Akm E. Ullah

[57] ABSTRACT

An optical fiber ribbon includes an interfacial layer between a plurality of coated optical fibers and a common coating layer. The interfacial layer includes a liquid lubricant material dispersed in a cross-linked solid material. The optical fiber ribbon is both peelable and thermally strippable. The interfacial layer adheres more strongly to the common coating material than to the coated optical fibers. The interfacial layer may be provided either as the outer layer of each of the individual coated optical fibers or as an inner layer of the common matrix coating.

7 Claims, 2 Drawing Sheets

OPTICAL FIBER RIBBON WHICH IS STRIPPABLE AND PEELABLE

BACKGROUND OF THE INVENTION

This invention relates to optical fiber ribbons suitable for low cost splicing.

A typical optical fiber ribbon includes a plurality of individually coated optical fibers disposed side-by-side in a common plane; a colored layer disposed over each outermost individual fiber coating or color pigment mixed with each outermost individual fiber coating; and one or more matrix common coating layers disposed about all of the coated optical fibers in the ribbon.

A primary reason for the use of optical fiber ribbons in telecommunication cables is their potential for mass splicing in the field. Although mass splicing equipment can be expensive, over long periods of time mass splicing is more efficient than individual splicing with its associated higher labor costs.

In order to splice optical fibers in an optical fiber ribbon, it is usually necessary to remove not only the common matrix coatings, but also individual coatings from the optical fibers, leaving only the optical fiber core and cladding, each of which may be formed of glass. Thermal stripping equipment is often used to remove coatings prior to splicing.

Claypoole et al. in U.S. Pat. No. 4,072,400, disclosed the use of a coating of a release agent over a resinous protective coating applied to the external longitudinal surface of an optical waveguide fiber.

Margolis, in U.S. Pat. No. 4,148,560, disclosed the use of an encapsulating material around a plurality of optical waveguide fibers which, when appropriately treated, was removable.

Noethe, in U.S. Pat. No. 4,176,910, disclosed the use of optical fiber ribbons in which each of a plurality of optical fibers have a separate layer of separating and lubricating material selected from a group consisting of either oils, powders, or other materials.

It is desirable for an optical fiber ribbon to be thermally strippable without leaving a coating residue. In my article *Testing of 4- and 8-fiber Ribbon Strippabilty* published in the 1992 proceedings of the International Wire & Cable Symposium, pp. 472–475, I analyzed methods for use of such thermal stripping equipment, varying settings such as strip speed, strip length, clamp force, and tool temperature. I presented the results according to a scale from 1.0 to 5.0, with 1.0 indicating no visible coating residue remained after stripping, and 5.0 indicating a heavy coating residue which could not be removed by a typical alcohol wipe remained after stripping. On this scale, 1.0 is the best result, and 5.0 is the worst result.

Another desirable attribute of optical fiber ribbons is not only to be able to separate the individual optical fibers in the ribbon, but also that the common matrix coating be peelable from the outer coatings on the individual optical fibers without damage to the optical fiber coatings. Peelability allows craftspersons to connectorize the separate optical fibers without undue difficulty for a "drop" connection. The separate optical fibers may then be attached to different connectors or may be routed to different locations in the network. Installations are simpler if the common matrix coating can be peeled without using special tools. The toughness of the common matrix coating as well as the degree of its adhesion to the coated optical fibers are factors determining the matrix peel force. The matrix peel force may be measured quantitatively using an Instron model 4201 tensile load testing machine.

In U.S. Pat. No. 5,408,564, I described an optical element comprising an interfacial layer disposed between coatings, the interfacial layer preferably having a thickness of about five microns. The interfacial layer is composed of a cross-linked material formed from a liquid dispersion. The dispersion comprises particles of a solid lubricant such as Teflon comprising 0.1% to 60% by weight of the dispersion. The resulting optical element has improved mechanical strippability of the outermost coating.

A method of disposing a release layer on an optical fiber is by spraying a liquid release material on the outer periphery of an optical fiber.

Yet another method of disposing a release layer on an optical fibers is by use of an ultraviolet light cured material having a gel constituting a large percentage thereof. However, the application of a gel material may be inconvenient or difficult to control.

Tight adhesion of the common matrix coating to the underlying individual coated optical fibers enhances thermal strippability, but is undesirable for peelability. In contrast, less adhesion of the outer common matrix coating to the underlying individual coated optical fibers is undesirable for thermal strippability, but enhances peelability. What is needed is an improved optical fiber ribbon which has both sufficient peelability and thermal strippability. It is toward the achievement of this goal that the invention is directed.

SUMMARY OF THE INVENTION

It is therefore an object of the present invention to provide an optical fiber ribbon which is both sufficiently peelable and sufficiently thermally strippable.

This and other objects are provided, according to the present invention, by providing an improved optical fiber ribbon. The optical fiber ribbon includes an interfacial layer disposed between the outermost layer on each individual optical fiber and the matrix coating commonly disposed about all of the individual coated optical fibers. The interfacial layer is formed of a non-reactive liquid lubricant dispersed in a carrier material. The liquid lubricant comprises from about 5% to about 19% by weight of the interfacial layer. The liquid lubricant remains uncured while the carrier material is cured to a solid state. This optical fiber ribbon has both the desirable attributes of peelability and thermal strippability.

BRIEF DESCRIPTION OF THE DRAWINGS

The preferred embodiments of the invention are described in the several drawings, in which.

DETAILED DESCRIPTION OF THE INVENTION

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
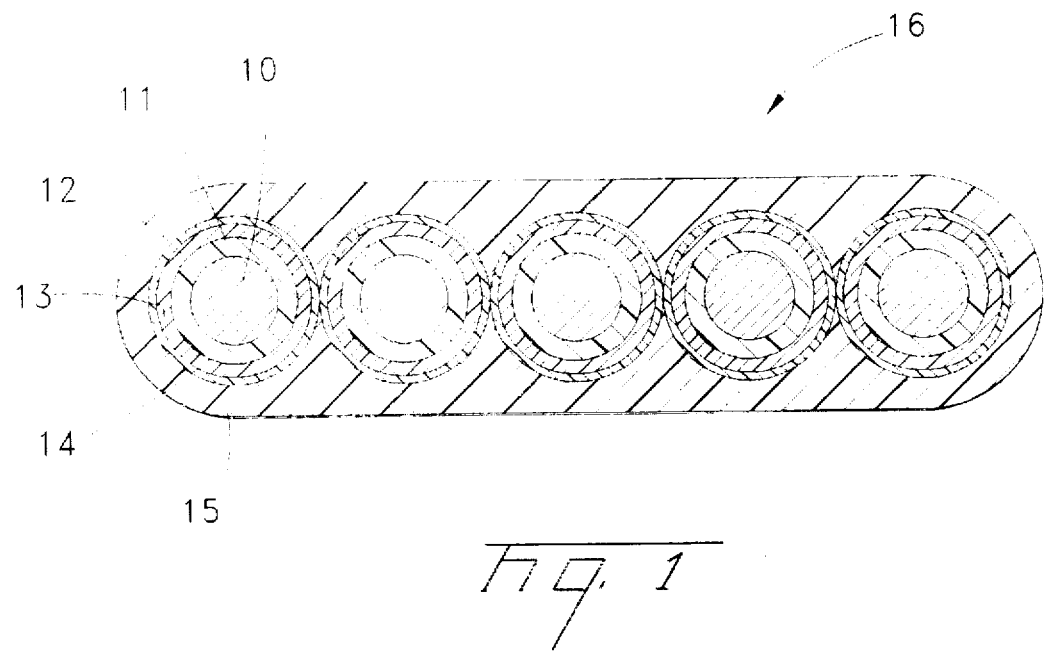
FIG. 1 is a cross-sectional view of an optical fiber ribbon according to the first embodiment of the invention.
Figure 2:
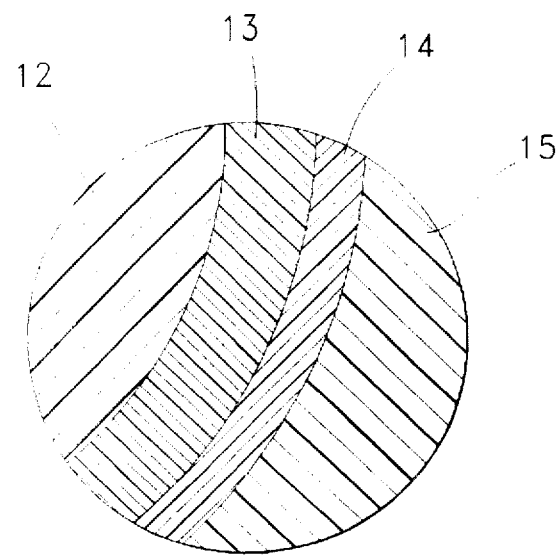
FIG. 2 is an expanded cross-sectional view of the interfacial layer of FIG. 1.

FIG. 1 illustrates a cross-sectional view of an improved optical fiber ribbon 16 according to the first embodiment of the invention. Optical fiber ribbon 16 includes five optical fibers 10, optical fibers 10 each including a cladded core. Optical fibers 10 each are coated by coatings 11, 12. Typically, primary coating layer 11 is formed of a relatively low modulus material, and secondary coating layer 12 is formed of a relatively high modulus material. Over secondary coating layer 12 is an ink layer 13, interfacial layer 14, and a protective matrix common outer coating 15. Protective common outer matrix coating 15 may be formed of a material which has been cured by ultraviolet light. Outer common coating 15 may comprise one or more layers.

An interfacial layer 14 is disposed between and contacting ink layer 13 and common coating 15. If no colored layer 13 were used, or if the coloring material were incorporated into secondary coating layer 12, interfacial layer 14 would be disposed between and contacting layers 12 and 15.

Samples of optical fiber ribbons were prepared including an interfacial layer comprising a polymer cross-linked by ultraviolet light having dispersed therein a liquid silicone oil, which is a lubricant material which is not curable by ultraviolet light. The viscosity of the silicone oil was between 1500 and 2500 centistokes.

It was found that samples having a percentage by weight of silicone oil of 20% or more experienced substantial crumbling of the inner and outer primary coatings and the common matrix coating during thermal stripping. It is believed that the greater amount of oil renders the interfacial layer less mechanically stable during thermal stripping, thus depriving the inner and outer primary coatings and the common matrix coating of adherence and mutual mechanical support during the thermal stripping process.

Samples having a percentage by weight of silicone oil of less than 20% by weight did not experience substantial crumbling of the inner and outer primary coatings during thermal stripping, and the coatings could be easily cleaned with one wipe of a solvent. Specifically, a sample having 15% by weight of silicone oil displayed acceptable thermal strippability. Using a linear interpolation, it is believed that optical fiber ribbon interfacial layers having 19% or less by weight of the silicone oil will have sufficient thermal strippability.

The common outer coating of a sample optical fiber ribbon having no silicone oil in its interfacial layer was not peelable. It is believed that this lack of oil resulted in excessive adherence of the interfacial layer to the common outer coating and the underlying individual optical fiber coatings. However, the common outer coating was peelable in sample optical fiber ribbons whose interfacial layers had eleven percent or more by weight of the silicone oil. Using a linear interpolation, it is believed that optical fiber ribbon interfacial layers having 5% or more by weight of the silicone oil dispersed therein will be sufficiently peelable.

Sample optical fiber ribbons in which the interfacial layer contained either 11% by weight or 15% by weight of silicone oil displayed sufficient peelability and thermal strippability.

Combining the peelability and strippability findings, it was concluded that optical fiber ribbons in which the interfacial layer contains from about 5% by weight to about 19% by weight of silicone oil therein would be sufficiently peelable and would display acceptable performance during thermal stripping.

Other nonreactive liquid lubricants which may be dispersed in the interfacial layer include other oils such as fluorinated oils, petroleum based oils such as mineral oils, synthetic hydrocarbon oils, or mixtures thereof.

The lubricant material is dispersed in a cross-linked carrier material. Such carrier materials may be chemically or thermally cured. Such materials also may be cured by ultraviolet or other radiation, and may be based on urethanes, esters, epoxies, silicones, or fluorinated acrylates.

The carrier materials are typically liquids which are cross-linkable by various means to assume a final solid form. The liquid lubricant material is simply mixed with the liquid carrier precursor, and remains in dispersion in the interfacial layer when the carrier material is cross-linked. For example, if silicone oil is to be dispersed in an ultraviolet light curable acrylate polymer, the liquids may be mixed into a dispersion by use of a commercial paint mixer, and the resulting dispersion is placed into a pressurized canister which transfers the dispersion to a coating die. A coated optical fiber is passed through the coating die, and thereafter under one or more ultraviolet lamps which cure the acrylate polymer to form the interfacial layer. Subsequently, the common outer coating layer is extruded over the interfacial layer.

The coated optical fiber often includes a colored layer. It is often desirable that the interfacial layer adhere more strongly to the common coating layer than to the colored layer, because the colored layer then remains on the optical fibers after the common coating layer has been removed. To help achieve this preferential bonding, a colored layer curable by ultraviolet radiation should be cured in a nitrogen atmosphere having less than 200 parts per million (ppm) of oxygen.

Proper curing of the colored layer is important in achieving preferential bonding, as undercured material tends to adhere to the interfacial layer. Any layer cured by ultraviolet light which underlies and contacts the interfacial layer should be thoroughly cured. The degree of cure may be measured by taking the ratio of C=C bonds present after curing to those present before curing. The number of C=C bonds may be measured by using an infrared spectrometer. The result is called percent "Reacted Acrylate Unsaturation", or %RAU. A percentage RAU of 85% or more is suitable for an ultraviolet light cured layer underlying the interfacial layer.

A sufficient level of curing is also important with respect to other properties such as chemical resistance, strength and optical performance. Low curing levels generate more static electricity and cause problems in winding and unwinding. The curing level is affected by the intensity of and exposure time to ultraviolet light and the environment in which curing takes place. The exposure time is a function of the processing speed.

The presence of oxygen interferes with the curing of the outer surface of the coating layer underlying the interfacial layer. The preferential adherence of the interfacial layer to the common coating layer normally results if oxygen constitutes less than 200 ppm of the atmosphere of the curing chamber; sometimes results if the oxygen concentration is 200 to 1000 ppm of the atmosphere of the curing chamber; and typically does not result if more than 1000 ppm of oxygen is present in the curing chamber. The presence of this preferential adherence of the interfacial layer to the common coating layer is observed experimentally by observing peelability results. A percentage RAU of 85% or more is suitable for the outer surface of an ultraviolet light cured layer underlying the interfacial layer. The oxygen is believed to inhibit the curing of the surface of the optical fiber coating underlying the interfacial layer, resulting in more uncured material on the outer surface of the underlying layer to which the interfacial layer may adhere when applied.

An optical fiber ribbon according to the first embodiment of the invention may include two glass optical fibers 10 arranged side-by-side, each optical fiber including a core and a cladding having an outer diameter of around 0.125 mm; an inner primary coating layer 11; a secondary coating layer 12 having an outer diameter of 0.250 mm; a colored layer 13 comprising an ink material having an outer diameter of around 0.260 mm; an interfacial layer 14 having a thickness of two to six μm; and a common coating 15 having a thickness of around 0.005 to 0.055 mm.

A detailed example of an optical fiber ribbon according to the first embodiment of the invention is as follows. Two CPC-6 type optical fibers were obtained from Corning, Inc. These optical fibers each have an outer diameter of about 0.245 mm, inclusive of primary and secondary coatings. An ink layer having an outer diameter of 0.257 mm was then applied to each of the coated optical fibers. Curing of the ink layer was conducted in a nitrogen atmosphere having a maximum oxygen level of 200 parts per million. A colored layer cure level of at least 85 percent RAU was achieved. An interfacial layer having an outer diameter of 0.262 mm was then applied to each of the coated colored optical fibers. The liquid lubricant in the interfacial layer was a liquid silicone material having a viscosity of between 1500 and 2500 centistokes and sold under the trade name Dow Corning 190 surfactant. The carrier material in the interfacial layer was an ultraviolet light curable acrylate material sold under the trade name DSM Desotech, Inc. 950-706. The liquid lubricant was dispersed at a concentration of eleven percent by weight of the interfacial layer. The two optical fibers, each having an outer interfacial layer, were then coated with a common layer of the DSM Desotech, Inc. 950-706 material. The resulting optical fiber ribbon had a width of about 0.6 mm and a thickness of about 0.36 mm.

Testing has been conducted on optical ribbons incorporating optical fibers each having an interfacial layer comprising a liquid silicone material constituting 11 percent by weight of the interfacial layer dispersed in a carrier material. Such optical ribbons in which the interfacial layer thickness exceeded 10.0 microns did not pass thermal stripping testing. Such optical ribbons in which the interfacial layer thickness did not exceed 6.0 microns did pass thermal stripping testing. Therefore, the average thickness of the interfacial layer is preferably less than 10.0 microns, and more preferably is less than 6.0 microns.

Preferential adherence of the interfacial layer to the common coating layer is also enhanced when the common coating layer comprises the same material as the carrier material of the interfacial layer. More preferably, the common coating layer consists of the same material as the carrier material of the interfacial layer.

An interfacial layer as described herein also may be applied between coatings on a single optical fiber. Either the single coated optical fiber or an optical fiber ribbon may constitute an optical element according to the invention. Such an optical element may comprise at least one optical fiber, each of said at least one optical fiber or optical fibers having a first coating having one or more layers, a second coating surrounding said first coating, and an interfacial layer disposed between and in contact with each of said first and second coatings; characterized in that said interfacial layer comprises from about 5% by weight to about 19% by weight of a liquid lubricant, said liquid lubricant being dispersed in cross-linked solid material.

Figure 3:
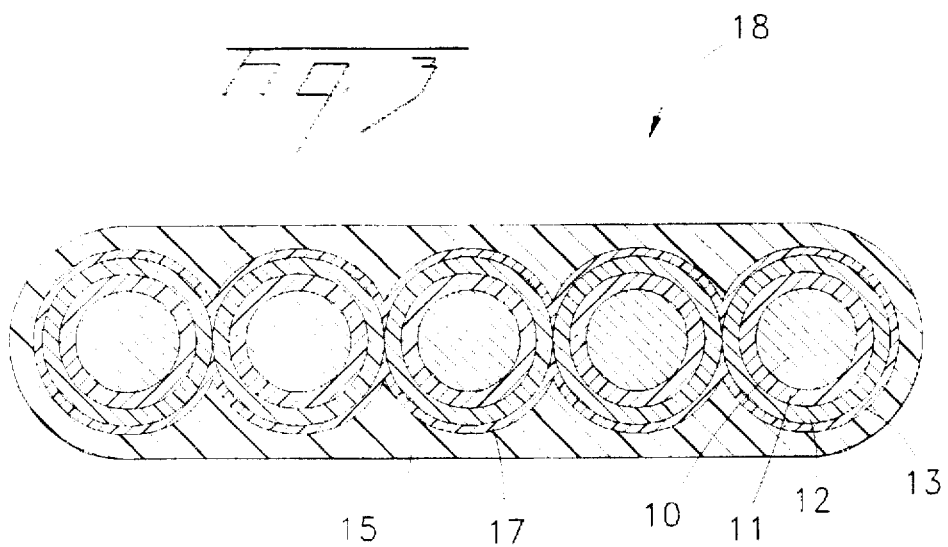
FIG. 3 is a cross-sectional view of an optical fiber ribbon according to the second embodiment of the invention; and, FIG. 4 is an expanded cross-sectional view of the interfacial layer of FIG. 3.
Figure 4:
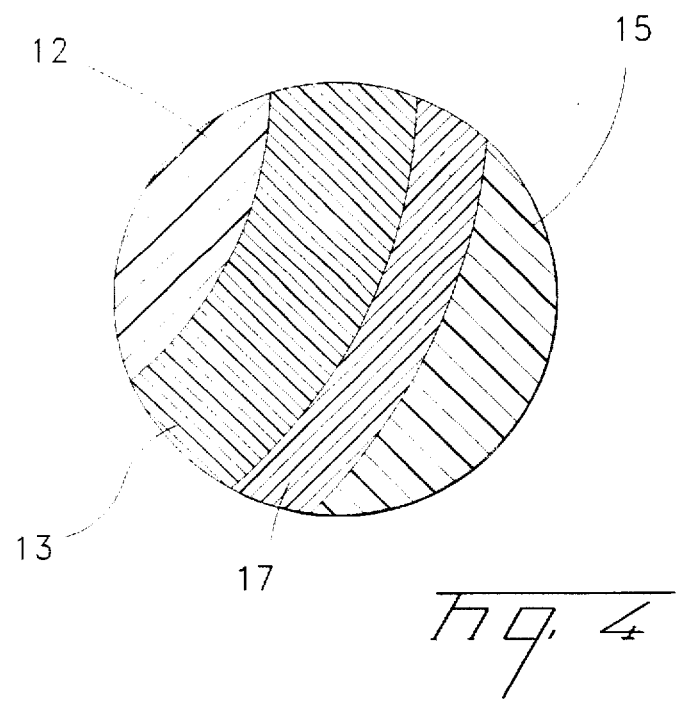

FIGS. 3 and 4 depict an optical fiber ribbon 18 according to the second embodiment of the invention. In the second embodiment, an interfacial layer 17 is an inner layer of the matrix common coating. Interfacial layer 17 is disposed to be between and touching ink layers 13 and common outer coating 15. Ink layers 13 may be disposed in contact with the corresponding ink layer or layers on the adjoining optical fiber or optical fibers, respectively; or interfacial layer 17 may be interposed between adjacent ink layers. The second embodiment of the invention is the same as the first embodiment of the invention in all other respects. Use of certain combinations of carrier materials and outer common coatings may make it necessary to apply and cure layer 17 before the outer common coating 15 is applied.

In either embodiment, the interfacial layer and the common outer matrix coating may be applied by coating equipment for the application of liquid materials which are cured to the solid state by ultraviolet light. An application system may comprise a container for holding pressurized liquid, supply tubing, a die system, and a cleaning system. The die system may comprise a guiding die, a sizing die, and a chamber between the guiding and sizing dies. Pressure and temperature controls should be available in the application system, and the creation of air bubbles should be avoided.

Multifiber application systems for processing optical fiber ribbons offer high production capacity, flexibility, and reliability. Such application systems may include modular and expandable machine and line control, process monitoring, data analysis and processing. The tension on each optical fiber should be measured and displayed in a fiber pay-off unit which may comprise an individual pay-off reel or bobbin for each optical fiber. Ultraviolet light curing may take place in a nitrogen atmosphere with the use of quartz tube high intensity lamps.. Both encapsulated and edge-bonded ribbons can be produced by using ultraviolet light curable resins.

It is to be understood that the invention is not limited to the exact details of the construction, operation, exact materials, or embodiments shown and described, as modifications and equivalents will be apparent to one skilled in the art without departing from the scope of the invention.

What is claimed is:

1. An optical fiber ribbon comprising a plurality of optical fibers, said ribbon comprising:
   each said optical fiber has a respective protective layer;
   each said protective layer is surrounded by and in contact with a respective interfacial layer;
   each said respective interfacial layer comprises a cross-linked polymer material and a liquid lubricant material in said polymer material;
   each respective interfacial layer is surrounded by a common coating which surrounds said optical fibers and said interfacial layers;
   whereby said interfacial layer enhances peelability and stripability of said common coating relative to said optical fibers.

2. The optical fiber ribbon of claim 1, wherein said common coating material is the outermost layer of the ribbon.

3. The optical fiber ribbon of claim 1, wherein said liquid material comprises an oil.

4. The optical fiber ribbon of claim 1, wherein said liquid lubricant is not dissolved in said common coating.

5. The optical fiber ribbon of claim 1, wherein said interfacial layer surrounds a plurality of said optical fibers.

6. An optical fiber ribbon comprising a plurality of optical fibers, said ribbon comprising:

each said optical fiber has a respective protective layer;

each said protective layer is surrounded by and in contact with a respective interfacial layer;

each said respective interfacial layer comprises a cross-linked polymer material and a liquid lubricant material in said polymer material;

each respective interfacial layer is surrounded by a common coating which common coating surrounds said optical fibers, said common coating comprises an outer layer of said ribbon being a substantially homogeneous polymeric material;

whereby said interfacial layer enhances peelability and stripability of said common coating relative to said optical fibers.

7. An optical fiber ribbon comprising a plurality of optical fibers, said ribbon comprising:

each said optical fiber has a respective protective layer;

each said protective layer is surrounded by and in contact with an interfacial layer;

said interfacial layer comprises a cross-linked polymer material and a liquid lubricant material in said polymer material;

each respective interfacial layer is surrounded by a common coating, the common coating surrounds said optical fibers, said common coating comprises an outer layer of said ribbon being a substantially homogeneous polymeric material; whereby said interfacial layer enhances peelability and stripability of said common coating relative to said optical fibers.

* * * * *